(12) United States Patent  
Reynolds et al.

(10) Patent No.: US 6,777,649 B2
(45) Date of Patent: Aug. 17, 2004

(54) METHOD AND APPARATUS FOR WELDING

(75) Inventors: Jon O. Reynolds, Appleton, WI (US); Timothy Matus, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/152,711

(22) Filed: May 21, 2002

(65) Prior Publication Data

US 2003/0217998 A1 Nov. 27, 2003

(51) Int. Cl.⁷ ................................................ B23K 9/10
(52) U.S. Cl. .................................... 219/132; 219/130.1
(58) Field of Search ..................... 219/130.1, 130.21, 219/130.31, 130.32, 130.33, 130.51, 137 PS, 132

(56) References Cited

U.S. PATENT DOCUMENTS

| 2,472,323 A | * | 6/1949 | Welch, Jr. | ............... 219/130.51 |
| 2,748,237 A | * | 5/1956 | Laporte | .................. 219/130.32 |
| 3,308,265 A | * | 3/1967 | Hobart | ................... 219/130.51 |
| 3,921,055 A | * | 11/1975 | Dorsey | ..................... 219/130.1 |
| 6,225,596 B1 | | 5/2001 | Chandler et al. | |

FOREIGN PATENT DOCUMENTS

| JP | 52-35731 | * | 3/1977 | ............... 219/130.1 |
| JP | 54-53652 | * | 4/1979 | ............... 219/130.1 |
| JP | 54-155950 | * | 12/1979 | ............... 219/130.1 |
| JP | 6-182548 | * | 7/1994 | ............... 219/130.1 |

* cited by examiner

Primary Examiner—Clifford C. Shaw
(74) Attorney, Agent, or Firm—George R. Corrigan

(57) ABSTRACT

A method and apparatus for providing welding power is disclosed. It includes a transformer with a primary winding and an output secondary winding. The ac side of a rectifier circuit is connected to the output secondary. A battery or other energy storage device, such as a capacitor, is connected in series with the dc side of the rectifier. The series combination is disposed to be connected to the load. Preferably, an input circuit receives a 115 volt ac input. The transformer has a primary to secondary turns ratio of at least about 9:1.

35 Claims, 2 Drawing Sheets

METHOD AND APPARATUS FOR WELDING

FIELD OF THE INVENTION

The present invention relates generally to the art of welding power supplies. More specifically, it relates to a welding power supply that receives an ac input and provides a welding output.

BACKGROUND OF THE INVENTION

There are many known types of welding power supplies used for many known types of welding applications. Some welding applications are performed using welding power supplies that are able to be plugged into a typical 115 volt duplex outlet, such as those found in homes, offices, businesses, etc. Such an input is frequently limited to 15 A (sometimes 20 amps) by a circuit breaker that often serves other outlets as well. Accordingly, the power that may be obtained from such an outlet is limited. This limits the power that may be provided to the weld.

Known welding power supplies powered by 115 volt ac utility power includes power supplies having tapped transformers to control the output. Another type uses a transformer with a phase controlled output. Welding is typically performed at up to 20–25 volts, and lesser voltages may result in difficulty welding. Thus, transformer based welding power supplies having an input of 115 volt ac must have a turns ratio that steps the voltage down by no more than a factor of five or six in order to provide adequate welding voltage. This means that, for a 15 A breaker, the maximum welding current would be about 75–90 A. This is inadequate for many welding applications, which may require, for example 100 A or 150 A. However, increasing the current requires a greater turns ratio, which results in the voltage being inadequate. Thus, prior art welding power supplies have provided inadequate current, inadequate voltage, or both.

Other known 115 volt welding systems use inverter or converter type power circuits. However, these power supplies are also necessarily limited by the input power of the duplex outlet. A DC bus created by such a power supply must be at the 20–25 volts needed for welding. The limited input power available again limits output current to an average of about 75–90 A.

Some ac prior art welders provided an unbalanced output to offset the naturally occurring unbalanced load when using a tungsten electrode. A dc bias was provided to add to the load in the EN half-cycle to effectively make the load equal to the EP half-cycle load. The dc offset was provided using a battery and diodes in some systems. However, the battery reduced the output voltage rather than enhanced it. For example, if the EP arc was 28 volts, and the EN arc is 16 volts, a 12 volt battery added to the EN arc (with bypass diodes for EP) would make the effective EN load 28 volts (16 volts from the arc plus 12 volts from the battery). This reduces the current available from the source for a given input power.

Another type of known welding power supply uses battery power as an input. These power supplies are generally limited in their ability to provide power and the duration for which they may provide power.

Because these known power supplies often provide inadequate power due to limitations of the input power, a welding power supply that can provide sufficient power for welding, while having a typical 115 volt duplex input, is desirable. Preferably, such a power supply will provide an output voltage in the range of 20–25 volts and up to 150 amps so that the welding process may be easily performed.

SUMMARY OF THE PRESENT INVENTION

According to a first aspect of the invention a welding-type power supply or method for providing welding-type power to a load includes a transformer with a primary winding and an output secondary winding. The ac side of a rectifier circuit is connected to the output secondary. A battery or other energy storage device, such as a capacitor, is connected in series with the dc side of the rectifier. The series combination is disposed to be connected to the load.

According to a second aspect of the invention a welding-type power supply and a method of providing welding-type power to a load includes an input circuit that receives a 115 volt ac input. A transformer is connected to the input circuit and has a primary to secondary turns ratio of at least about 9:1. An output circuit is connected to the secondary winding.

According to a third aspect of the invention a welding-type power supply and a method of providing welding-type power to a load includes a converting circuit that receives an ac input and provides a dc signal. A battery or other energy storage device, such as a capacitor, is connected in series with the dc signal, and the series combination is connected to the load.

The output secondary winding includes a plurality of taps selected by an output select switch that selectively connects the ac side to one of the taps in one embodiment.

The transformer includes a charging secondary winding, and a charging rectifier causes the battery or energy storage device to be selectively charged in another alternative. The charging may be done in response to a trigger signal from a welding torch, and the connections are made with switches, such as a relay, in various embodiments.

The welding-type power supply is connected to power using a power cord with a male 115 volt plug in other embodiments.

The transformer has a primary to output secondary turns ratio of at least about 9:1 or about 10:1 in various embodiments.

The welding-type power supply can provide a welding current of 150 amps and/or the battery is a 12 volt battery in additional embodiments.

Other principal features and advantages of the invention will become apparent to those skilled in the art upon review of the following drawings, the detailed description and the appended claims.

Figure 1:
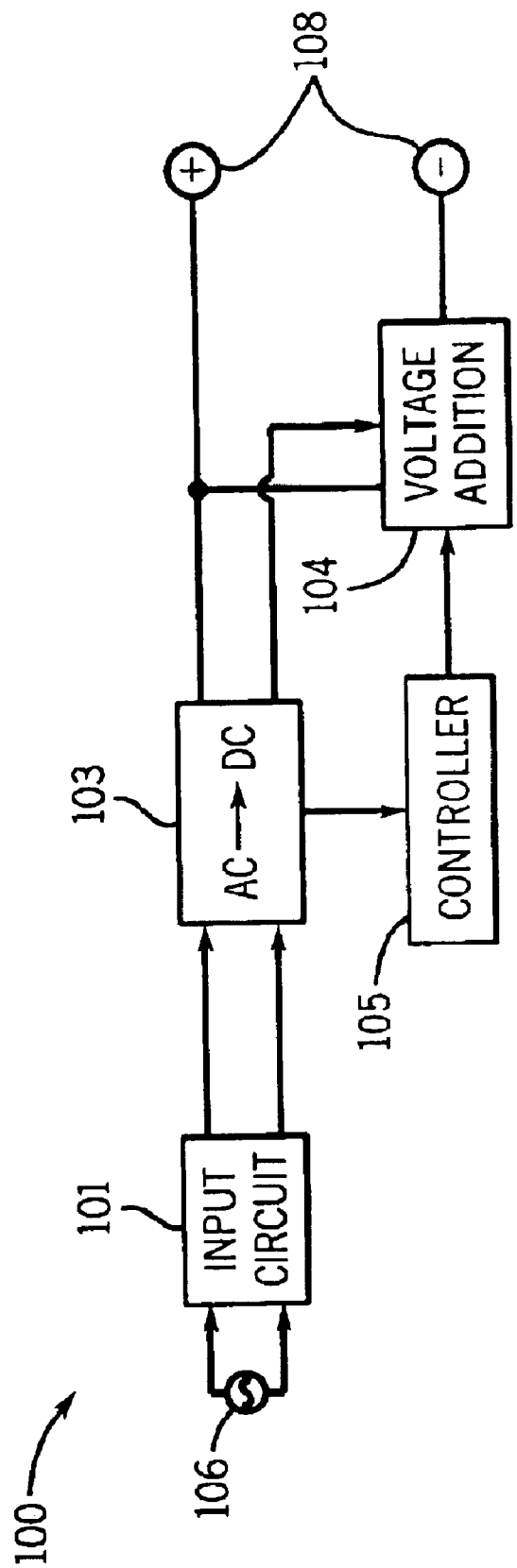
FIG. 1 is a block diagram of a welding system in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular system and particular components to provide a particular output from a particular input, it should be understood at the outset that the invention can also be implemented with other power circuits, batteries, components and have other inputs and provide other outputs.

Generally, the invention provides for welding from a 115 volt ac input and providing up to a 150 A output, at an output voltage of up to about 25 volts. This is accomplished in the preferred embodiment by integrating the electrical demand over time when welding is being performed and when welding is not being performed. This provides a duty cycle that is a function of the charging rate and the discharging rate while welding. More specifically it is done by providing a battery in series with the output, such that the battery "boosts" (or adds to) the output voltage. Thus, the power circuit need only provided a 12 volt output (with 12 volts coming from the battery). This allows the power circuit to provide a greater current output. For example, for a 115 volt input at 15 A, the power circuit can provide 150 A at 12 volts DC, but only 75 A at 24 volts.

The invention further provides that, in the preferred embodiment, the battery be charged when welding is not being performed. Thus, using a large storage battery, such as an automotive-type 12 volt dc battery, allows for welding at 150 A and 25 volts, or at 200 A and 20 volts, for an extended period of time. Then, when welding is not occurring, the battery may be charged.

The power circuit may be transformer based or converter based (such as inverters, PWM, boost converter, buck converter, etc.). Switches may be used that are responsive to the welding current, a trigger signal, an OFF switch, etc., that configure the battery in series with the load, or connect it to the charging circuit.

The charging circuit may be a separate circuit, such as a separate transformer and rectifier, separate converter, etc., or the battery may be charged by putting it across the power circuit, and disconnecting the load output from the power circuit.

Referring now to FIG. 1, a welding-type power supply 100 includes an input circuit 101, an ac to dc converting circuit 103 and a voltage addition circuit 104 that are controlled by a controller 105 to receive an ac input and provide dc welding-type power on an output 108.

Welding-type power supply, as used herein, includes any device capable of supplying welding, plasma cutting, and/or induction heating power including resonant power supplies, quasi-resonant power supplies, etc., as well as control circuitry and other ancillary circuitry associated therewith. Welding type power, as used herein, refers to welding, plasma or heating power. Converting circuit, as used herein, includes a power circuit that receives or provides an ac or dc signal, and converts it to the other of an ac or dc signal, to a different voltage, or to a different frequency. Controller, as used herein, includes digital and analog circuitry, discrete or integrated circuitry, microprocessors, DSPs, etc., and software, hardware and firmware, located on one or more boards, used to control a device such as a power supply.

Input 106 is a 115 Vac standard duplex input in the preferred embodiment, and can be other types of inputs, such as ac utility power of other voltages, generated power, or dc power from a battery, etc. Input circuit 101 may include a male plug connecting to an outlet, or it may include input circuitry that rectifies, converts, transforms, or otherwise processes input power.

Converting circuit 103 includes a transformer and a rectifier in the preferred embodiment, and receives the 115 volt ac input and provides about a 12 volt dc load output. Alternative embodiments include a rectifier and a converter, such as a chopper, boost converter, buck converter, inverter, etc to create a dc bus. Generally, it provides an output at a voltage less than the voltage needed to weld, and at a power limited by the input power.

Converting circuit 103 also includes, in the preferred embodiment, a separate winding and rectifier to charge a battery in voltage addition circuit 104. In alternative embodiments the winding used to create the output provided for welding is reconnected to charge the battery. Other alternatives provide for having a converter, such as a chopper, boost converter, buck converter, inverter, etc., create a dc bus to charge the battery. Two such circuits could be provided (one for welding one for charging), or one circuit that is controlled to provide one voltage for welding and another for charging, or provide the same voltage for either operation, may be provided.

Voltage addition circuit 104 includes a battery, such as a 12 volt automotive-type battery, and the connections and switches needed to configure the battery to add to the output of circuit 103, or to be charged by part of circuit 103. The switches, relays, etc., used to configure the system in a welding mode or charging mode may be part of converting circuit 103 and/or voltage addition circuit 104, or be part of an output circuit. Other types of batteries or energy storage devices, such as electrochemical capacitors, are used in alternative embodiments. Battery, as used herein, includes a lead-acid 12 volt battery (such as an automotive battery e.g.), other types of batteries, and batteries of other voltages.

Controller 105 includes logic used to control the switches or relays that configure the system, as well as circuitry that performs control functions found in typical welding systems. It provides control signals or outputs to accomplish the control functions. Control output, as used herein, includes an output used to control a circuit, such as a setpoint, switch signals, gate signals, phase control signals, etc.

The system is shown as a dc welder, and may include an output circuit having an inductor or stabilizer. Other output circuits may include capacitors, inverters, etc., and the output may be an ac output. In either case the output is provided to the load—which may be an output circuit or the actual welding arc.

Figure 2:
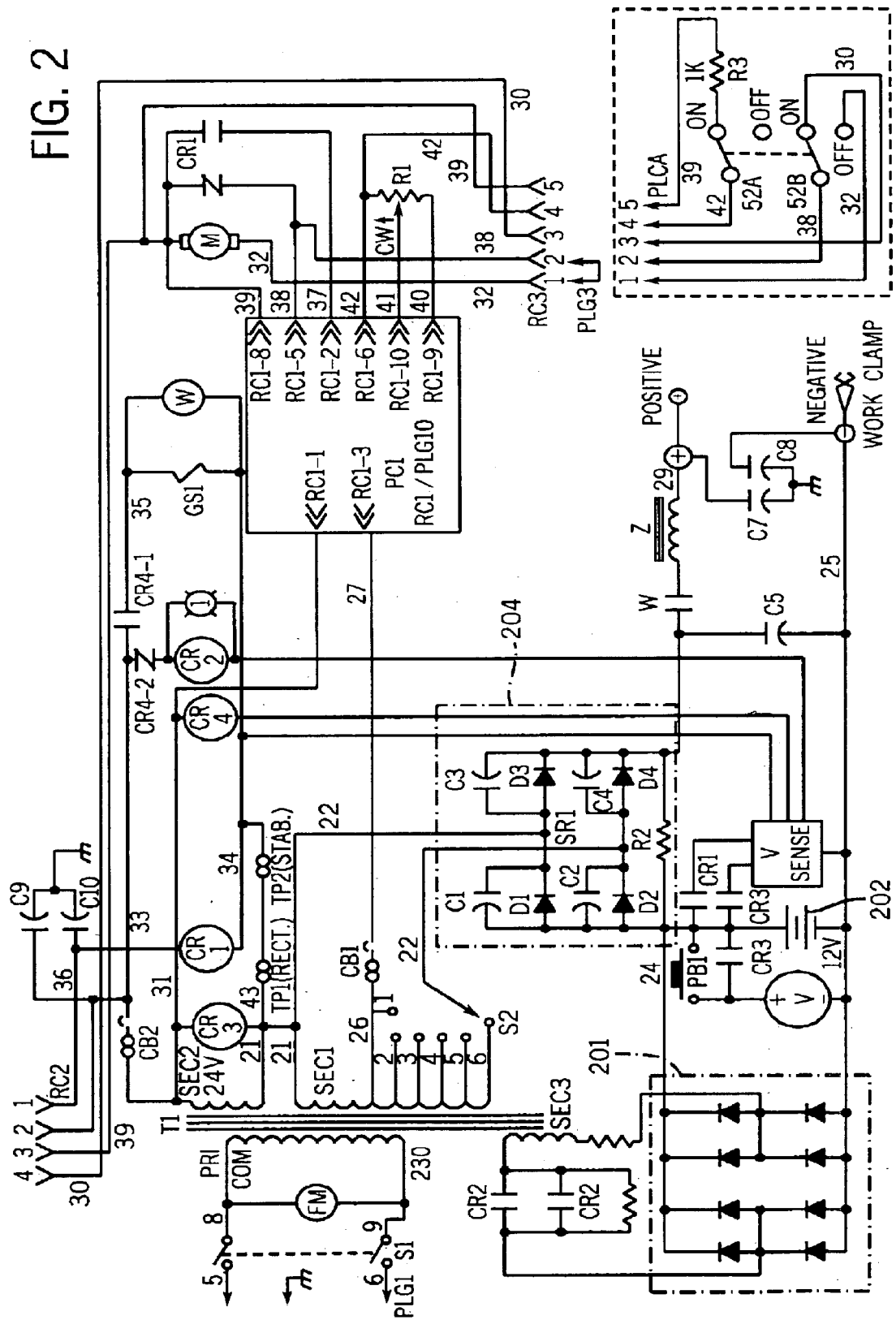
FIG. 2 is a circuit diagram of a power circuit in accordance with the present invention.

Referring now to FIG. 2, a diagram of a circuit that implements the present invention is shown. Input power is received through an on/off switch S1. This switch controls the entire system, and when off neither the charging nor the welding functions are performed. Power is provided through switch S1 (when closed) to a primary winding PR1 of a transformer T1. An output secondary SEC1 provides the welding output, and transformer T1 has an turns ratio of, preferably, at least about 9:1 (PR1 to SEC1), and in the preferred embodiment about 10:1. Therefore a 15 amp input produces a 150 amp output. (About 10:1 indicates the ratio may be between 9½ and 10½). The voltage is stepped down by the turns ratio. Thus the voltage across SEC1 will be about ⅑th or ⅒th of the ac input voltage. The output voltage is controlled by an output select switch or tap switch S2, in accordance with known systems.

A pair of pins 1 and 2 of RC2 are closed when the gun trigger is pulled (indicating the user is welding). This applies 24 volts from a control power secondary SEC2 (which has an appropriate turns ratio) to a relay coil CR1. Relay coil CR1 closes relay switches CR1, which powers a wire feed motor M and applies 12 volts to a burn back timer (V Sense). The burn back timer briefly maintains the welding output after the motor stops when the trigger is released, to prevent the wire from sticking in the puddle.

After the burn back timer times out, a control output is provided when a relay coil CR4 picks up a relay switch CR4. The closing of relay coil CR4 closes a relay switch CR4-1 which picks up the W contractor relay coil. This applies the weld output voltage to the positive output or load terminal through a rectifier circuit 204 that includes a plurality of diodes D1–D4 arranged in a full bridge configuration. (A half bridge can be used in other embodiments). Other circuit elements may be included in the rectifier circuit, including switches used for configuring the system.

Relay coil CR4 also opens a relay switch CR4-2, which opens the circuit to relay coil CR2. This causes relay switches CR2 to open, thus creating an open circuit across the output of a secondary SEC3, which is the charging secondary winding (the winding that provides the power to charge the battery).

If the trigger had not been pulled, relay switch CR4-2 would remain closed and relays switches CR2 would remain closed. This applies the output of SEC3 to the ac side of a rectifier circuit 201, which includes diodes arranged in a full bridge configuration (a half bridge can be used in other embodiments). Ac side of a rectifier or rectifying circuit, as used herein, includes the inputs to a rectifier that receive an ac signal, and their related circuitry.

The dc side of rectifier circuit 201 is about 12 volts and is applied to a battery 202 (dc side of a rectifier or rectifying circuit, as used herein, includes the outputs from a rectifier that provide a dc signal, and their related circuitry).

The configuration of the system is responsive to the trigger because when the trigger has been pulled, and the connections described above are made, the welding output circuit includes battery 202 connected in series with the dc side of a rectifier circuit 202. This results in the welding output being 150 amps (as set by the ratio of PR1:SEC1) and at a voltage of about 25 volts—or the voltage of battery 202 added to the dc side voltage of rectifier circuit 204. Connected in series, as used herein, includes a direct connection of two or more circuits or circuit elements, or two circuits or circuit elements connected through one or more other circuits or circuit elements.

The arrangement of relays thus selectively connects the charging secondary (via the charging rectifier) to the battery, or connects the battery in series with the dc side of the output rectifier. Selectively connect, as used herein, includes connecting one or more of a plurality of possible connections to another connection.

The preferred embodiment disconnects the charge voltage regulator and the battery voltage sense meter from the battery when the machine is switched off to prevent them from discharging the battery. The voltage sensor used to control the battery charger operates such that if the battery is discharged to less than approximately 8 volts, the charging relay CR2 will not pick up. This feature protects the battery charging circuit and the battery itself if the battery becomes full discharged. The battery is then trickle charged by the resistor that bypasses relay switches CR2. The charging circuit is a 45 amp circuit limited by a resistor R2 in series with the charging circuit.

The relays that controllably open and close to configure the system are considered switches, and other types of switches such as IGBTs, transistors, etc may be used. The switches have a switch control input (the relay coil or gate e.g.) that controls the opening and closing thereof.

Alternatives include using a different turns ratio and different output voltages. Another embodiment provides for using a capacitor (or other energy storage device) rather than a battery, and charging and discharging that device as described with respect to the battery.

Numerous modifications may be made to the present invention which still fall within the intended scope hereof. Thus, it should be apparent that there has been provided in accordance with the present invention a method and apparatus for a welding system that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A welding-type power supply for providing welding-type power to a load, comprising:
    a transformer, having a primary winding, an output secondary winding, and a charging secondary winding;
    a rectifier circuit, having an ac side connected to the output secondary and further having a dc side;
    a battery connected in series with the dc side to add to the output voltage, wherein the series combination is disposed to be connected to the load;
    a charging rectifier and a switch, having a control input, disposed to selectively connect the charging rectifier to at least one of the battery and the charging secondary winding; and
    a controller responsive to a trigger signal from a welding torch, and having a control output connected to the control input 2. The welding-type power supply of claim 1, wherein the output secondary winding includes a plurality of taps and the welding-type power supply further comprises an output select switch disposed to selectively connect the ac side to one of the taps.

3. The welding-type power supply of claim 1, wherein the switch is a relay.

4. The welding-type power supply of claim 1, further comprising a power cord having one end in electrical communication with the primary, and the other end having a male 115 volt plug.

5. The welding-type power supply of claim 4, wherein the transformer has a primary to output secondary turns ratio of at least about 9:1.

6. The welding-type power supply of claim 5, wherein the welding-type power supply can provide a welding current of 150 amps.

7. The welding-type power supply of claim 5, wherein the battery is a 12 volt battery.

8. The welding-type power supply of claim 1, further comprising a power cord having one end in electrical communication with the primary, and the other end having a male 115 volt plug.

9. A method of providing welding power comprising:
    transforming an ac input signal into a secondary ac signal;
    rectifying the secondary ac signal to produce a dc signal;
    providing the dc signal in series combination with a battery to add to the output voltage, wherein the series combination is provided to the load; and charging the battery when welding is not occurring in response to a trigger signal from a welding torch indicating the welding process is not being performed.

10. The method of claim 9, further comprising selecting a current output by selecting a turns ratio using one of a plurality taps on a transformer.

11. The method of claim 9, wherein charging comprises transforming the ac signal to produce a charging ac signal, rectifying the charging ac signal to produce a charging dc signal, and selectively applying the charging dc signal to the battery.

12. The method of claim 9, wherein transforming includes stepping the voltage down by a ratio of about 9:1.

13. The method of claim 9, further comprising receiving a 115 volt signal as the ac input signal.

14. The method of claim 9, further comprising providing 150 amps to the load.

15. The method of claim 9, wherein providing the ac signal in series combination includes providing the ac signal in series combination with a 12 volt battery.

16. A welding-type power supply for providing welding-type power to a load, comprising:
a transformer means for transforming an ac input signal into a second ac signal;
a rectifier means for receiving the second ac signal and providing a dc signal;
an energy storage means for adding voltage to the dc signal, and connected in series with the dc signal such that the series combination is disposed to be connected to the load; and
charging means for selectively charging the energy storage means in response to a trigger signal from a welding gun.

17. The welding-type power supply of claim 16, wherein the transformer means a plurality of taps and the welding-type power supply further comprises means for selectively connecting the rectifier means to one of the taps.

18. The welding-type power supply of claim 17:
wherein the transformer means includes a charging secondary winding means for producing an ac charging signal that is part of the charging means; and
the charging means further includes means for rectifying the ac charging signal to produce a dc charging signal 19. The welding-type power supply of claim 18, further comprising a power cord means for connecting the transformer means to a 115 v outlet.

20. The welding-type power supply of claim 16, further comprising a power cord means for connecting the transformer means to a 115 v outlet.

21. The welding-type power supply of claim 16, wherein the welding-type power supply can provide a welding current of 150 amps.

22. A method of providing welding power comprising:
transforming an ac input signal into a secondary ac signal;
rectifying the secondary ac signal to produce a dc signal and;
providing the dc signal in series combination with a battery in response to a trigger signal from a gun, wherein the series combination is provided to the load.

23. A welding-type power supply for providing welding-type power to a load, comprising:
a transformer, having a primary winding and an output secondary winding;
a rectifier circuit, having an ac side connected to the output secondary and further having a dc side and;
an energy storage device; and
a switch, responsive to a trigger signal from a gun, disposed to connect the energy storage device in series with the dc side to add to the output voltage, wherein the series combination is disposed to be connected to the load.

24. The welding-type power supply of claim 23, wherein the energy storage device is a capacitor.

25. The welding-type power supply of claim 24, wherein the transformer includes a charging secondary winding, and the welding-type power supply further comprises a charging rectifier and a switch disposed to selectively connect the charging rectifier to at least one of the energy storage device and the charging transformer.

26. The welding-type power supply of claim 23, wherein the transformer has a primary to output secondary turns ratio of at least about 9:1.

27. The welding-type power supply of claim 23, wherein the welding-type power supply can provide a welding current of 150 amps.

28. A welding-type power supply for providing welding-type power to a load, comprising:
a converting circuit that is disposed to receive an ac input and provides a dc signal and;
an energy storage device connected in series with the dc signal in response to a trigger signal from a gun to add to the output voltage, wherein the series combination is disposed to be connected to the load.

29. The welding-type power supply of claim 28, wherein the energy storage device is a capacitor.

30. A method of providing welding power comprising:
transforming an ac input signal into a secondary ac signal;
rectifying the secondary ac signal to produce a dc signal and;
providing the dc signal in series combination with an energy storage device in response to a trigger signal from a gun to add to the output voltage, wherein the series combination is provided to the load.

31. The method of claim 30, further comprising selecting a current output by selecting a turns ratio using one of a plurality taps on a transformer, and wherein the energy storage device is a capacitor.

32. A method of providing welding-type power to a load, comprising:
converting an ac input into a dc signal and;
adding an energy storage device voltage in response to a trigger signal from a gun to the dc signal to produce a signal with a combined voltage that is disposed to be connected to the load.

33. The method of claim 32, further comprising providing a welding current of 150 amps when the ac input is 115 v, and wherein the energy storage device is a capacitor.

34. A method of providing welding power comprising:
transforming an ac input signal into a secondary ac signal;
rectifying the secondary ac signal to produce a dc signal and;
providing, in response to a trigger signal from a gun, the dc signal in series combination with an energy storage device, wherein the series combination is provided to the load.

35. The method of claim 34, wherein the energy storage device is a capacitor.

* * * * *